US012310415B2

(12) United States Patent
Chen

(10) Patent No.: US 12,310,415 B2
(45) Date of Patent: May 27, 2025

(54) VAPOR PROVISION SYSTEM AND CORRESPONDING METHOD

(71) Applicant: Nicoventures Trading Limited, London (GB)

(72) Inventor: Shixiang Chen, London (GB)

(73) Assignee: NICOVENTURES TRADING LIMITED, London (GB)

( * ) Notice: Subject to any disclaimer, the term of this patent is extended or adjusted under 35 U.S.C. 154(b) by 932 days.

(21) Appl. No.: 17/593,063

(22) PCT Filed: Mar. 6, 2020

(86) PCT No.: PCT/GB2020/050544
§ 371 (c)(1),
(2) Date: Sep. 8, 2021

(87) PCT Pub. No.: WO2020/183135
PCT Pub. Date: Sep. 17, 2020

(65) Prior Publication Data

US 2022/0183384 A1 Jun. 16, 2022

(30) Foreign Application Priority Data

Mar. 8, 2019 (GB) ..................................... 1903144

(51) Int. Cl.
*A24F 40/53* (2020.01)
*A24F 40/10* (2020.01)
(Continued)

(52) U.S. Cl.
CPC .............. *A24F 40/53* (2020.01); *A24F 40/10* (2020.01); *A24F 40/42* (2020.01); *A24F 40/46* (2020.01);
(Continued)

(58) Field of Classification Search
CPC .......... A24F 40/10; A24F 40/42; A24F 40/46; A24F 40/53; A24F 40/57; H05B 1/023; H05B 3/0014
See application file for complete search history.

(56) References Cited

U.S. PATENT DOCUMENTS

2008/0092912 A1 4/2008 Robinson et al.
2016/0174611 A1 6/2016 Monsees et al.
(Continued)

FOREIGN PATENT DOCUMENTS

EP 2468117 A1 6/2012
EP 2468118 A1 6/2012
WO WO-2024141331 A1 * 7/2024

OTHER PUBLICATIONS

International Preliminary Report on Patentability for Application No. PCT/GB2020/050544, mailed on Sep. 23, 2021, 8 pages.
(Continued)

*Primary Examiner* — Dana Ross
*Assistant Examiner* — James F Sims, III
(74) *Attorney, Agent, or Firm* — BURR & FORMAN LLP

(57) ABSTRACT

A vapor provision system comprising: a heating element for generating a vapor from a vapor precursor material; and control circuitry configured to provide power for the heating element for performing a heating operation to generate the vapor and to compare a measurement of a resistance value for the heating element for the heating operation with a baseline resistance value for the heating element for use in detecting a fault condition. The control circuitry is further configured to: establish the baseline resistance value for a first heating operation by making a measurement of a first resistance value for the heating element; and establish the baseline resistance value for a second, subsequent, heating operation by making a measurement of a second resistance
(Continued)

value for the heating element if more than a predetermined period of time has elapsed between the first heating operation and the second heating operation, and otherwise using the same baseline resistance value as for the first heating operation.

14 Claims, 2 Drawing Sheets

(51) Int. Cl.

| | |
|---|---|
| ***A24F 40/42*** | (2020.01) |
| ***A24F 40/46*** | (2020.01) |
| ***A24F 40/57*** | (2020.01) |
| ***H05B 1/02*** | (2006.01) |
| ***H05B 3/00*** | (2006.01) |

(52) U.S. Cl.

CPC ............ *A24F 40/57* (2020.01); *H05B 1/023* (2013.01); *H05B 3/0014* (2013.01)

(56) References Cited

U.S. PATENT DOCUMENTS

| | | | | |
|---|---|---|---|---|
| 2017/0231276 | A1 | 8/2017 | Mironov et al. | |
| 2017/0251725 | A1 | 9/2017 | Buchberger et al. | |
| 2018/0020735 | A1 * | 1/2018 | Bilat | A24F 40/50 |
| 2023/0086697 | A1 * | 3/2023 | Fujinaga | A24F 40/42 131/329 |

OTHER PUBLICATIONS

International Search Report and Written Opinion for Application No. PCT/GB2020/050544, mailed on May 19, 2020, 12 pages.

Office Action issued in corresponding Mexican Patent Application No. MX/a/2021/010706 mailed Jul. 31, 2024, all pages cited in its entirety.

* cited by examiner

VAPOR PROVISION SYSTEM AND CORRESPONDING METHOD

PRIORITY CLAIM

The present application is a National Phase entry of PCT Application No. PCT/GB2020/050544, filed Mar. 6, 2020, which claims priority from Great Britain Application No. 1903144.2, filed Mar. 8, 2019, each of which is hereby fully incorporated herein by reference.

TECHNICAL FIELD

The present disclosure relates to vapor provision systems such as, but not limited to, nicotine delivery systems (e.g. electronic cigarettes and the like).

BACKGROUND

Electronic vapor provision systems such as electronic cigarettes (e-cigarettes) generally contain a vapor precursor material, such as a reservoir of a source liquid containing a formulation, typically but not necessarily including nicotine, or a solid material such as a tobacco-based product, from which a vapor is generated for inhalation by a user, for example through heat vaporization. Thus, a vapor provision system will typically comprise a vapor generation chamber containing a vaporizer, e.g. a heating element, arranged to vaporize a portion of precursor material to generate a vapor in the vapor generation chamber. As a user inhales on the device and electrical power is supplied to the vaporizer, air is drawn into the device through inlet holes and into the vapor generation chamber where the air mixes with the vaporized precursor material and forms a condensation aerosol. There is a flow path between the vapor generation chamber and an opening in the mouthpiece so the incoming air drawn through the vapor generation chamber continues along the flow path to the mouthpiece opening, carrying some of the vapor/condensation aerosol with it, and out through the mouthpiece opening for inhalation by the user. Some electronic cigarettes may also include a flavor element in the flow path through the device to impart additional flavors. Such devices may sometimes be referred to as hybrid devices and the flavor element may, for example, include a portion of tobacco arranged in the air path between the vapor generation chamber and the mouthpiece so that vapor/condensation aerosol drawn through the devices passes through the portion of tobacco before exiting the mouthpiece for user inhalation.

Problems can arise with such vapor provision systems if the heating element becomes dry. This can happen, for example, because the supply of precursor material is running out. In that event, rapid over-heating in and around the heating element can occur. Having regard to typical operating conditions, the over-heated sections might be expected to quickly reach temperatures in the range 500 to 900° C. Not only does this rapid heating potentially damage components within the vapor provision system, it may also adversely affect the evaporation process of any residual precursor material. For example, the excess heat may cause the residual precursor material to decompose, for example through pyrolysis, which can potentially release unpleasant tasting substances into the air stream to be inhaled by a user.

SUMMARY

In accordance with some embodiments described herein, there is provided a vapor provision system comprising:

a heating element for generating a vapor from a vapor precursor material; and control circuitry configured to provide power for the heating element for performing a heating operation to generate the vapor and to compare a measurement of a resistance value for the heating element relating to a heating operation with a baseline resistance value for the heating element for use in ultimately detecting a fault condition during the heating operation, wherein the control circuitry is further configured to:

establish the baseline resistance value for a first heating operation by making a measurement of a first resistance value for the heating element; and establish the baseline resistance value for a second, subsequent, heating operation by making a measurement of a second resistance value for the heating element if more than a predetermined period of time has elapsed between the first heating operation and the second heating operation, and otherwise using the same baseline resistance value as for the first heating operation.

In accordance with some embodiments described herein, there is provided a cartridge containing a heating element for use in the vapor provision system as described in the above embodiments.

In accordance with some embodiments described herein, there is provided a control circuitry, for use in a vapor provision system for generating a vapor from a vapor precursor material, wherein the control circuitry is operable to provide power for use in performing a heating operation in the vapor provision system, and operable to compare a measurement of a resistance value relating to a heating operation with a baseline resistance value for use in ultimately detecting a fault condition during the heating operation, wherein the control circuitry is further configured to:

establish the baseline resistance value for a first heating operation by making a measurement of a first resistance value; and establish the baseline resistance value for a second, subsequent, heating operation by making a measurement of a second resistance value if more than a predetermined period of time has elapsed between the first heating operation and the second heating operation, and otherwise using the same baseline resistance value as for the first heating operation.

In accordance with some embodiments described herein, there is provided a method of operating control circuitry in a vapor provision system, the vapor provision system comprising a heating element for generating a vapor from a vapor precursor material, wherein the control circuitry is configured to provide power for the heating element for performing a heating operation to generate the vapor and to compare a measurement of a resistance value for the heating element relating to a heating operation with a baseline resistance value for the heating element for use in ultimately detecting a fault condition during the heating operation; wherein the method comprises the control circuitry:

establishing the baseline resistance value for a first heating operation by making a measurement of a first resistance value for the heating element; and establishing the baseline resistance value for a second, subsequent, heating operation by making a measurement of a second resistance value for the heating element if more than a predetermined period of time has elapsed between the first heating operation and the second heating operation, and otherwise using the same baseline resistance value as for the first heating operation.

BRIEF DESCRIPTION OF THE DRAWINGS

Embodiments of the invention will now be described, by way of example only, with reference to the accompanying drawings, in which.

DETAILED DESCRIPTION OF THE DRAWINGS

Figure 1:
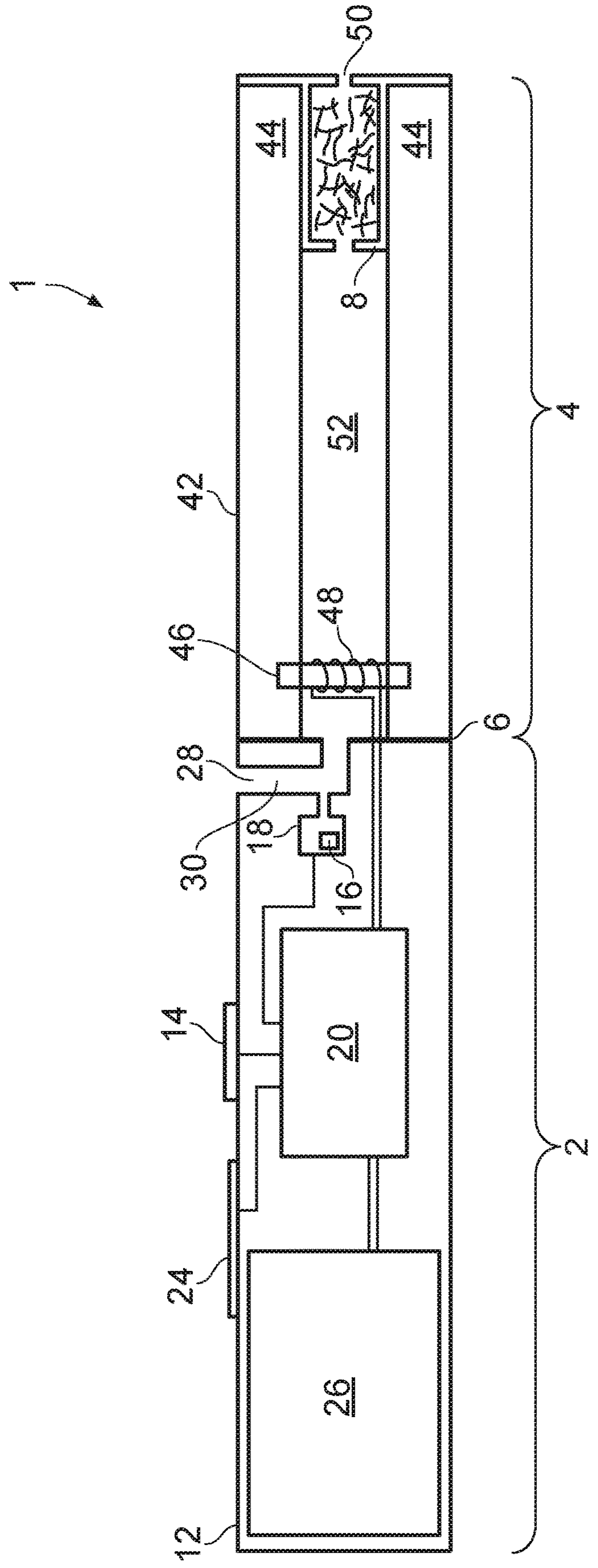
FIG. 1 represents in highly schematic cross-section a vapor provision system in accordance with certain embodiments of the disclosure.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure relates to vapor provision systems, which may also be referred to as aerosol provision systems, such as e-cigarettes, including hybrid devices. Throughout the following description the term "e-cigarette" or "electronic cigarette" may sometimes be used, but it will be appreciated this term may be used interchangeably with vapor provision system/device and electronic vapor provision system/device. Furthermore, and as is common in the technical field, the terms "vapor" and "aerosol", and related terms such as "vaporize", "volatilize" and "aerosolize", may generally be used interchangeably.

Vapor provision systems (e-cigarettes) often, though not always, comprise a modular assembly including both a reusable part and a replaceable (disposable) cartridge part. Often the replaceable cartridge part will comprise the vapor precursor material and the vaporizer and the reusable part will comprise the power supply (e.g. rechargeable battery), activation mechanism (e.g. button or puff sensor), and control circuitry. However, it will be appreciated these different parts may also comprise further elements depending on functionality. For example, for a hybrid device the cartridge part may also comprise the additional flavor element, e.g. a portion of tobacco, provided as an insert ("pod"). In such cases the flavor element insert may itself be removable from the disposable cartridge part so it can be replaced separately from the cartridge, for example to change flavor or because the usable lifetime of the flavor element insert is less than the usable lifetime of the vapor generating components of the cartridge. The reusable device part will often also comprise additional components, such as a user interface for receiving user input and displaying operating status characteristics.

In some embodiments, the substance to be delivered by the vapor/aerosol provision system may be an aerosolizable material which may comprise an active constituent, a carrier constituent and optionally one or more other functional constituents.

The active constituent may comprise one or more physiologically and/or olfactory active constituents which are included in the aerosolizable material in order to achieve a physiological and/or olfactory response in the user. The active constituent may for example be selected from nutraceuticals, nootropics, and psychoactives. The active constituent may be naturally occurring or synthetically obtained. The active constituent may comprise for example nicotine, caffeine, taurine, theine, a vitamin such as B6 or B12 or C, melatonin, a cannabinoid, or a constituent, derivative, or combinations thereof. The active constituent may comprise a constituent, derivative or extract of tobacco or of another botanical. In some embodiments, the active constituent is a physiologically active constituent and may be selected from nicotine, nicotine salts (e.g. nicotine ditartrate/nicotine bitartrate), nicotine-free tobacco substitutes, other alkaloids such as caffeine, or mixtures thereof.

In some embodiments, the active constituent is an olfactory active constituent and may be selected from a "flavor" and/or "flavorant" which, where local regulations permit, may be used to create a desired taste, aroma or other somatosensorial sensation in a product for adult consumers. In some instances such constituents may be referred to as flavors, flavorants, cooling agents, heating agents, and/or sweetening agents. They may include naturally occurring flavor materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus Mentha, eucalyptus, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gasone or more of extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

In some embodiments, the flavor comprises menthol, spearmint and/or peppermint. In some embodiments, the flavor comprises flavor components of cucumber, blueberry, citrus fruits and/or redberry. In some embodiments, the flavor comprises eugenol. In some embodiments, the flavor comprises flavor components extracted from tobacco. In some embodiments, the flavor may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucalyptol, WS-3.

The carrier constituent may comprise one or more constituents capable of forming an aerosol. In some embodiments, the carrier constituent may comprise one or more of glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more other functional constituents may comprise one or more of pH regulators, coloring agents, preservatives, binders, fillers, stabilizers, and/or antioxidants.

For modular devices a cartridge and control unit are electrically and mechanically coupled together for use, for example using a screw thread, latching or bayonet fixing with appropriately engaging electrical contacts. When the vapor precursor material in a cartridge is exhausted, or the user wishes to switch to a different cartridge having a different vapor precursor material, a cartridge may be removed from the control unit and a replacement cartridge attached in its place. Devices conforming to this type of two-part modular configuration may generally be referred to as two-part devices or multi-part devices.

It is relatively common for electronic cigarettes, including multi-part devices, to have a generally elongate shape and, for the sake of providing a concrete example, certain embodiments of the disclosure described herein will be taken to comprise a generally elongate multi-part device employing disposable cartridges with a tobacco pod insert. However, it will be appreciated the underlying principles described herein may equally be adopted for different electronic cigarette configurations, for example single-part devices or modular devices comprising more than two parts, refillable devices and single-use disposable devices, and non-hybrid devices which do not have an additional flavor element, as well as devices conforming to other overall shapes, for example based on so-called box-mod high performance devices that typically have a more box-like shape. More generally, it will be appreciated certain embodiments of the disclosure are based on electronic cigarettes that are configured to provide activation functionality in accordance with the principles described herein, and the specific constructional aspects of electronic cigarette configured to provide the described activation functionality are not of primary significance.

FIG. 1 is a cross-sectional view through an example e-cigarette 1 in accordance with certain embodiments of the disclosure. The e-cigarette 1 comprises two main components, namely a reusable part 2 and a replaceable/disposable cartridge part 4. In this specific example the e-cigarette 1 is assumed to be a hybrid device with the cartridge part 4 including a removable insert 8 comprising an insert housing containing a portion of shredded tobacco. However, the fact this example is a hybrid device is not in itself directly significant to the device activation functionality as described further herein.

In normal use the reusable part 2 and the cartridge part 4 are releasably coupled together at an interface 6. When the cartridge part is exhausted or the user simply wishes to switch to a different cartridge part, the cartridge part may be removed from the reusable part and a replacement cartridge part attached to the reusable part in its place. The interface 6 provides a structural, electrical and air path connection between the two parts and may be established in accordance with conventional techniques, for example based around a screw thread, latch mechanism, or bayonet fixing with appropriately arranged electrical contacts and openings for establishing the electrical connection and air path between the two parts as appropriate. The specific manner by which the cartridge part 4 mechanically mounts to the reusable part 2 is not significant to the principles described herein, but for the sake of a concrete example is assumed here to comprise a latching mechanism, for example with a portion of the cartridge being received in a corresponding receptacle in the reusable part with cooperating latch engaging elements (not represented in FIG. 1). It will also be appreciated the interface 6 in some implementations may not support an electrical connection between the respective parts. For example, in some implementations a vaporizer may be provided in the reusable part rather than in the cartridge part, or the transfer of electrical power from the reusable part to the cartridge part may be wireless (e.g. based on electromagnetic induction), so that an electrical connection between the reusable part and the cartridge part is not needed.

The cartridge part 4 may in accordance with certain embodiments of the disclosure be broadly conventional. In FIG. 1, the cartridge part 4 comprises a cartridge housing 42 formed of a plastics material. The cartridge housing 42 supports other components of the cartridge part and provides the mechanical interface 6 with the reusable part 2. The cartridge housing is generally circularly symmetric about a longitudinal axis along which the cartridge part couples to the reusable part 2. In this example the cartridge part has a length of around 4 cm and a diameter of around 1.5 cm. However, it will be appreciated the specific geometry, and more generally the overall shapes and materials used, may be different in different implementations.

Within the cartridge housing 42 is a reservoir 44 that contains liquid vapor precursor material. The liquid vapor precursor material may be conventional, and may be referred to as e-liquid. The liquid reservoir 44 in this example has an annular shape with an outer wall defined by the cartridge housing 42 and an inner wall that defines an air path 52 through the cartridge part 4. The reservoir 44 is closed at each end with end walls to contain the e-liquid. The reservoir 44 may be formed in accordance with conventional techniques, for example it may comprise a plastics material and be integrally molded with the cartridge housing 42.

The flavor element insert (tobacco pod) 8 in this example is inserted into an open end of air path 52 opposite to the end of the cartridge 4 which couples to the control unit 2 and is retained by a friction fit. The housing for the flavor element insert 8 includes a collar that abuts the end of the cartridge housing 42 to prevent over insertion. The housing for the flavor element insert 8 also includes an opening at each end to allow air drawn along the air path 52 during use to pass through the flavor element insert 8 and so pick up flavors from the flavorant within (tobacco in this example) before exiting the cartridge 4 though a mouthpiece outlet 50 for user inhalation.

The cartridge part further comprises a wick 46 and a heating element (vaporizer) 48 located towards an end of the reservoir 44 opposite to the mouthpiece outlet 50. In this example the wick 46 extends transversely across the cartridge air path 52 with its ends extending into the reservoir 44 of e-liquid through openings in the inner wall of the reservoir 44. The openings in the inner wall of the reservoir are sized to broadly match the dimensions of the wick 46 to provide a reasonable seal against leakage from the liquid reservoir into the cartridge air path without unduly compressing the wick, which may be detrimental to its fluid transfer performance.

The wick 46 and heating element 48 are arranged in the cartridge air path 52 such that a region of the cartridge air path 52 around the wick 46 and heating element 48 in effect defines a vaporization region for the cartridge part. E-liquid in the reservoir 44 infiltrates the wick 46 through the ends of the wick extending into the reservoir 44 and is drawn along the wick by surface tension/capillary action (i.e. wicking). The heating element 48 in this example comprises an electrically resistive wire coiled around the wick 46. In this example the heating element 48 comprises a nickel chrome alloy (Cr20Ni80) wire and the wick 46 comprises a glass fiber bundle, but it will be appreciated the specific vaporizer configuration is not significant to the principles described herein. In use electrical power may be supplied to the heating element 48 to vaporize an amount of e-liquid (vapor precursor material) drawn to the vicinity of the heating element 48 by the wick 46. Vaporized e-liquid may then become entrained in air drawn along the cartridge air path from the vaporization region through the flavor element insert 8 and out the mouthpiece outlet 50 for user inhalation.

The rate at which e-liquid is vaporized by the vaporizer (heating element) 48 will depend on the amount (level) of power supplied to the heating element 48 during use. Thus electrical power can be applied to the heating element to selectively generate vapor from the e-liquid in the cartridge part 4, and furthermore, the rate of vapor generation can be changed by changing the amount of power supplied to the heating element 48, for example through pulse width and/or frequency modulation techniques.

The reusable part 2 comprises an outer housing 12 with an opening that defines an air inlet 28 for the e-cigarette, a battery 26 for providing operating power for the electronic cigarette, control circuitry 20 for controlling and monitoring the operation of the electronic cigarette, a user input button 14, an inhalation sensor (puff detector) 16, which in this example comprises a pressure sensor located in a pressure sensor chamber 18, and a visual display 24.

The outer housing 12 may be formed, for example, from a plastics or metallic material and in this example has a circular cross-section generally conforming to the shape and size of the cartridge part 4 so as to provide a smooth transition between the two parts at the interface 6. In this example, the reusable part has a length of around 8 cm so the overall length of the e-cigarette when the cartridge part and reusable part are coupled together is around 12 cm. However, and as already noted, it will be appreciated that the overall shape and scale of an electronic cigarette implementing an embodiment of the disclosure is not significant to the principles described herein.

The air inlet 28 connects to an air path 30 through the reusable part 2. The reusable part air path 30 in turn connects to the cartridge air path 52 across the interface 6 when the reusable part 2 and cartridge part 4 are connected together. The pressure sensor chamber 18 containing the pressure sensor 16 is in fluid communication with the air path 30 in the reusable part 2 (i.e. the pressure sensor chamber 18 branches off from the air path 30 in the reusable part 2). Thus, when a user inhales on the mouthpiece opening 50, there is a drop in pressure in the pressure sensor chamber 18 that may be detected by the pressure sensor 16 and also air is drawn in through the air inlet 28, along the reusable part air path 30, across the interface 6, through the vapor generation region in the vicinity of the atomizer 48 (where vaporized e-liquid becomes entrained in the air flow when the vaporizer is active), along the cartridge air path 52, and out through the mouthpiece opening 50 for user inhalation.

The battery 26 in this example is rechargeable and may be of a conventional type, for example of the kind normally used in electronic cigarettes and other applications requiring provision of relatively high currents over relatively short periods. The battery 26 may be recharged through a charging connector in the reusable part housing 12, for example a USB connector.

The user input button 14 in this example is a conventional mechanical button, for example comprising a spring mounted component which may be pressed by a user to establish an electrical contact. In this regard, the input button may be considered to provide a manual input mechanism for the terminal device, but the specific manner in which the button is implemented is not significant. For example, different forms of mechanical button or touch-sensitive button (e.g. based on capacitive or optical sensing techniques) may be used in other implementations. The specific manner in which the button is implemented may, for example, be selected having regard to a desired aesthetic appearance.

The display 24 is provided to give a user with a visual indication of various characteristics associated with the electronic cigarette, for example current power setting information, remaining battery power, and so forth. The display may be implemented in various ways. In this example the display 24 comprises a conventional pixilated LCD screen that may be driven to display the desired information in accordance with conventional techniques. In other implementations the display may comprise one or more discrete indicators, for example LEDs, that are arranged to display the desired information, for example through particular colors and/or flash sequences. More generally, the manner in which the display is provided and information is displayed to a user using the display is not significant to the principles described herein. Some embodiments may not include a visual display and may include other means for providing a user with information relating to operating characteristics of the electronic cigarette, for example using audio signaling or haptic feedback, or may not include any means for providing a user with information relating to operating characteristics of the electronic cigarette.

The control circuitry 20 is suitably configured/programmed to control the operation of the electronic cigarette to provide functionality in accordance with embodiments of the disclosure as described further herein, as well as for providing conventional operating functions of the electronic cigarette in line with the established techniques for controlling such devices. The control circuitry (processor circuitry) 20 may be considered to logically comprise various sub-units/circuitry elements associated with different aspects of the electronic cigarette's operation in accordance with the principles described herein and other conventional operating aspects of electronic cigarettes, such as display driving circuitry and user input detection. It will be appreciated the functionality of the control circuitry 20 can be provided in various different ways, for example using one or more suitably programmed programmable computer(s) and/or one or more suitably configured application-specific integrated circuit(s)/circuitry/chip(s)/chipset(s) configured to provide the desired functionality.

Thus the vapor provision system 1 comprises a user input button 14 and an inhalation sensor 16. In accordance with certain embodiments of the disclosure the control circuitry 20 is configured to receive signaling from the inhalation sensor 16 and to use this signaling to determine if a user is inhaling in the electronic cigarette and also to receive signaling from the input button 14 and to use this signaling to determine if a user is pressing (i.e. activating) the input button. These aspects of the operation of the electronic cigarette (i.e. puff detection and button press detection) may in themselves be performed in accordance with established techniques (for example using conventional inhalation sensor and inhalation sensor signal processing techniques and using conventional input button and input button signal processing techniques).

Figure 2:
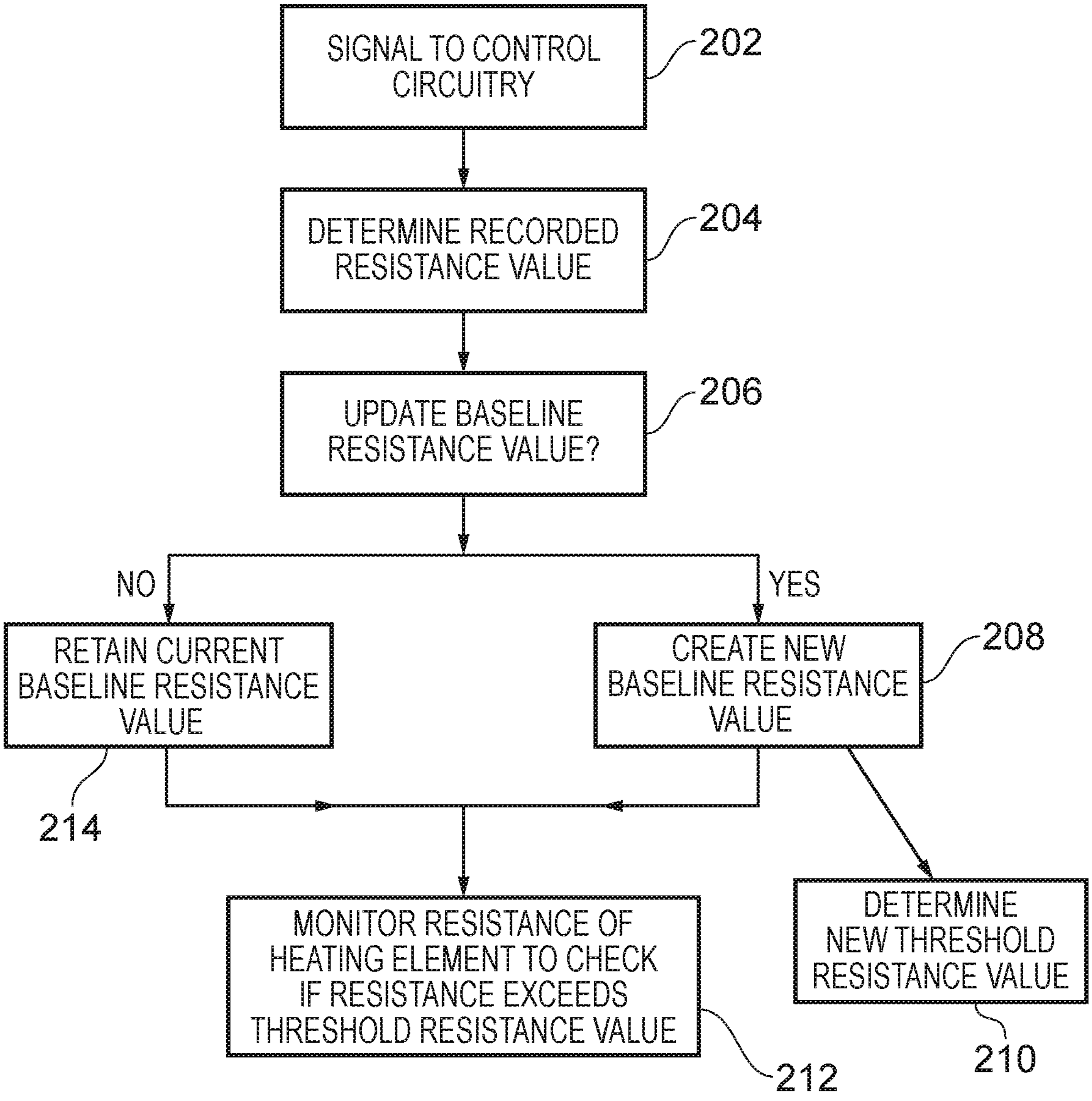
FIG. 2 is a flow diagram representing some operating steps for the vapor provision system of FIG. 1 in accordance with certain embodiments of the disclosure.

With reference to FIG. 2, the control circuitry 20 is configured to power the heating element 48 in response to a signal from either the user input button 14 of the inhalation sensor 16 (step 202 in FIG. 2). In the event of such a signal being received, the control circuitry 20 provides power to the heating element 48 for performing a heating operation to generate an aerosol/vapor from the vapor precursor material contained within the vapor provision system. Accordingly, at the start of each heating operation, the control circuitry 20 is configured to measure a resistance value $R_1$ for the heating element 48 (step 204). The resistance value is measured at a particular time within the heating operation shortly before the heating element 48 is heated.

The control circuitry 20 then determines whether this heating operation is the first heating operation to have occurred for a predetermined period of time, for instance 15 minutes (step 206). If so, the control circuitry 20 establishes a baseline resistance value $R_0$ based on the measured resistance value $R_1$ (step 208). The baseline resistance value $R_0$ is a reflection of the resistance, and thus the temperature, of the heating element 48, in a state when it is cold/unused.

Using the baseline resistance value $R_0$, the control circuitry 20 determines a threshold resistance value $R_{Thres}$ (step 210) which is higher than the baseline resistance value $R_0$. The threshold resistance value $R_{Thres}$ is indicative of a resistance for the heating element 48 whose corresponding temperature is too high. The value for this threshold resistance value will depend on the vapour provision system used. However, in some embodiments the threshold resistance value $R_{Thres}$ is based on a predetermined multiple of the baseline resistance value $R_0$. One particular example is $R_{Thres}=2.2\times R_0$. In some embodiments of vapor provision system, $R_{Thres}$ may be in the region of 1100 mOhm-1500 mOhm.

Following the measurement of this initial resistance value $R_1$, and any determination of the baseline resistance value $R_0$, the control circuitry then monitors the resistance of the heating element during the heating operation to determine a monitored resistance value R. For each monitored resistance value R, the control circuitry compares this resistance value R with the threshold resistance value $R_{Thres}$ (step 212). In the case where the monitored resistance R value exceeds the threshold resistance value $R_{Thres}$, an event may be triggered by the control circuitry, which may be an alarm or placing the vapor provision system into an 'off' or 'standby' state.

After the heating operation, the control circuitry 20 stops power being provided to the heating element 48, which causes the heating element to cool down, and then waits for a new signal from either the user input button 14 of the inhalation sensor 16 to begin a subsequent heating operation.

Upon a new signal being received, the control circuitry 20 operates in the same way as described above in relation to the previous heating operation, in that it measures a resistance value $R_2$ for the heating element 48 shortly before it is heated (step 204), and determines a baseline resistance value $R_0$ based on the measured resistance value $R_2$ in the event the heating operation is the first heating operation to have occurred since the predetermined period of time beforehand (for instance 15 minutes) (steps 206 and 208). In practice, the predetermined period of time may be selected based on the time taken for the heating element 48 to sufficiently cool down following a prior heating operation between heating operations.

If a prior heating operation has occurred within the predetermined period of time, the control circuitry 20 maintains the baseline resistance value $R_0$ used in the previous heating operation (step 214), unless the measured resistance value $R_2$ for the current heating operation is less than the measured resistance value $R_1$ from the previous heating operation—in which case the control circuitry 20 updates the baseline resistance value $R_0$ based on the measured resistance value $R_2$ from the current heating operation (step 208).

The purpose of the control circuitry 20 maintaining the baseline resistance value $R_0$ from the prior heating operation is to account for instances where the subsequent heating operation occurs shortly after the previous heating operation, where the heating element 48 will still be hot from this previous heating operation.

In the remaining instances where the baseline resistance value $R_0$ is updated based on the measured resistance value from the current heating operation (step 208), this ensures a baseline resistance value is generated which is indicative of the current resistance (and thus temperature) of the heating element 48.

Thus, as discussed above, approaches in accordance with embodiments of the disclosure provide a vapor provision system which balances power consumption by not calculating a new baseline resistance value $R_0$ after every heating operation, whilst at the same time ensuring the current baseline resistance value $R_0$ is an appropriate value from which to calculate the threshold resistance value $R_{Thres}$ for the given heating operation.

In accordance with embodiments of the disclosure, the monitored resistance value R may include a correction resistance value which accounts for resistances caused by the control circuitry 20 itself and its operation. These resistances will vary depending on the vapor provision system, and its associated control circuitry 20, but may typically be in the region of 50 mOhm-80 mOhm. In one particular example, the correction resistance value may be 65 mOhm. In these embodiments, the monitored resistance value would be calculated as the perceived monitored resistance value as nominally determined by the control circuitry 20 minus the correction resistance value.

In accordance with embodiments of the disclosure, the first measured resistance value $R_1$ (i.e. the baseline resistance value $R_0$) may also include a separate correction resistance value. This correction value would account for the additional resistance caused by heating of the heating element 48 when performing the resistance measurement itself. In that regard the first measured resistance value $R_1$ is of a "cold" system such that any heating of the heating element 48 may distort the baseline resistance value $R_0$ established from the first measured resistance value $R_1$. The separate correction resistance will again vary depending on the vapor provision system, and its associated control circuitry 20, but may typically be in the region of 35 mOhm-65 mOhm. In one particular example, the separate correction resistance may be 50 mOhm. In these embodiments, the first resistance value $R_1$ would be calculated as the perceived first resistance value as nominally determined by the control circuitry 20 minus both the separate correction resistance value and the correction resistance value.

In terms of the system used by the control circuitry 20 to monitor the resistance of the heating element 48, the process of measuring the resistance of the heating element 48 may be performed in accordance with conventional resistance measurement techniques. That is to say, the control circuitry 20 may comprise a resistance-measuring component that is based on established techniques for measuring resistance (or a corresponding electrical parameter).

In accordance with embodiments of the disclosure where the vapor precursor material is located in the cartridge part 4, which is detachable from the second reusable part 2 containing the heating element 48 and the control circuitry 20, in some instances the control circuitry 20 may be further configured to establish the baseline resistance value for a given heating operation by making a measurement of a further resistance value for the heating element if the given heating operation is the first to occur following the cartridge part being attached to the second part. In that event, the further resistance value would be measured at a particular time within the heating operation shortly before the heating element 48 is heated. With this arrangement, the control circuitry 20 has a baseline resistance value $R_0$ which pertains to the heating element 48 to which the control circuitry 20 is connected.

In accordance with some embodiments of the disclosure, the control circuitry 20 for a given heating operation may first determine whether a prior heating operation has occurred within the predetermined period of time, before measuring the resistance value $R_2$. In the event where the time between the heating operations is less than the predetermined period of time, the control circuitry may then be configured to maintain the baseline resistance value $R_0$ used in the previous heating operation (step 214) without measuring the resistance value $R_2$.

The control circuitry 20 in some embodiments may not use the predetermined period of time as the mechanism for updating the baseline resistance value $R_0$, but may instead be configured to update the baseline resistance value $R_0$ in the event the recorded resistance value $R_2$ from the current heating operation is lower than the recorded resistance value $R_1$ from the previous heating operation. For other embodiments, in the event that the predetermined period of time has not elapsed between two heating operations, the control circuitry 20 may be configured to measure the resistance value $R_2$ for the heating element 48 for the second heating operation, and in that case establish the baseline resistance value $R_0$ based on the measured resistance value $R_2$ if the measured resistance value $R_2$ is lower than the measured resistance value $R_1$ from the previous heating operation, and otherwise use the same baseline resistance value $R_0$ as for the previous heating operation.

In other embodiments, the control circuitry 20 may update the baseline resistance value $R_0$ in the event at least one, or both, of the predetermined period of time criterion, and the criterion that the measured resistance value $R_2$ from the current heating operation is lower than the measured resistance value $R_1$ from the previous heating operation, is satisfied.

While the above-described embodiments have in some respects focused on some specific example vapor provision systems, it will be appreciated the same principles can be applied for vapor provision systems using other technologies. That is to say, the specific manner in which various aspects of the vapor provision system function are not directly relevant to the principles underlying the examples described herein.

For example, whereas the above-described embodiments have primarily focused on devices having an electrical heater based vaporizer for heating a liquid vapor precursor material, the same principles may be adopted in accordance with vaporizers based on other technologies, for example piezoelectric vibrator based vaporizers or optical heating vaporizers, and also devices based on other vapor precursor materials, for example solid materials, such as plant derived materials, such as tobacco derivative materials, or other forms of vapor precursor materials, such as gel, paste or foam based vapor precursor materials.

Furthermore, and as already noted, it will be appreciated the above-described approaches in connection with an electronic cigarette may be implemented in cigarettes having a different overall construction than that represented in FIG. 1. For example, the same principles may be adopted in an electronic cigarette which does not comprise a two-part modular construction, but which instead comprises a single-part device, for example a disposable (i.e. non-rechargeable and non-refillable) device. Furthermore, in some implementations of a modular device, the arrangement of components may be different. For example, in some implementations the control unit may also comprise the vaporizer with a replaceable cartridge providing a source of vapor precursor material for the vaporizer to use to generate vapor. Furthermore still, whereas in the above-described examples the electronic cigarette 1 includes a flavor insert 8, other examples implementations may not include such an additional flavor element.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein, and it will thus be appreciated that features of the dependent claims may be combined with features of the independent claims in combinations other than those explicitly set out in the claims. The disclosure may include other inventions not presently claimed, but which may be claimed in future.

The invention claimed is:

1. A vapor provision system comprising:

a heating element for generating a vapor from a vapor precursor material; and control circuitry configured to provide power for the heating element for performing a heating operation to generate the vapor and to compare a measurement of a resistance value for the heating element for the heating operation with a baseline resistance value for the heating element for use in detecting a fault condition, wherein the control circuitry is further configured to:

establish the baseline resistance value for a first heating operation by making a measurement of a first resistance value for the heating element; and establish the baseline resistance value for a second, subsequent, heating operation by making a measurement of a second resistance value for the heating element if more than a predetermined period of time has elapsed between the first heating operation and the second heating operation, and otherwise using the same baseline resistance value as for the first heating operation;

wherein the control circuitry is further configured to make a measurement of a second resistance value for the heating element for the second heating operation if less than the predetermined period of time has elapsed between the first heating operation and the second heating operation, and is further configured in that case to establish the baseline resistance value based on the second resistance value if the second resistance value is lower than the first resistance value, and otherwise use the same baseline resistance value as for the first heating operation.

2. The vapor provision system according to claim 1, wherein the control circuitry is further configured to determine a threshold resistance value based on the baseline resistance value.

3. The vapor provision system according to claim 2, wherein the threshold resistance value is based on a predetermined multiple of the baseline resistance value.

4. The vapor provision system according to claim 2, wherein the control circuitry is further configured to monitor the resistance of the heating element during its heating operations to determine a monitored resistance value, and trigger an event in the case where the monitored resistance value exceeds the threshold resistance value.

5. The vapor provision system according to claim 4, wherein the monitored resistance value includes a primary correction resistance value.

6. The vapor provision system according to claim 5, wherein the primary correction resistance value is between 50mOhm-80 mOhm.

7. The vapor provision system according to claim 1, wherein the first resistance value includes a secondary correction resistance value.

8. The vapor provision system according to claim 7, wherein the secondary correction resistance value is between 35 mOhm-65 mOhm.

9. The vapor provision system according to claim 1, wherein the predetermined period of time is 15 minutes.

10. The vapor provision system according to claim 1, further comprising the vapor precursor material and heating element located in a cartridge part which is detachable from a second part containing the control circuitry.

11. The vapor provision system according to claim 10, wherein the control circuitry is further configured to establish the baseline resistance value for a given heating operation by making a measurement of a further resistance value for the heating element if the given heating operation is the first to occur following the cartridge part being attached to the second part.

12. The vapor provision system according to claim 1, wherein the system comprises an inhalation sensor, and wherein the control circuitry is configured to provide power for the heating element for a heating operation in response to a signal from the inhalation sensor which is indicative of a user inhaling on the vapor provision system.

13. A control circuitry, for use in a vapor provision system for generating a vapor from a vapor precursor material, wherein the control circuitry is operable to provide power for use in performing a heating operation in the vapor provision system, and operable to compare a measurement of a resistance value for the heating operation with a baseline resistance value for use in detecting a fault condition, and wherein the control circuitry is further configured to:

establish the baseline resistance value for a first heating operation by making a measurement of a first resistance value; and establish the baseline resistance value for a second, subsequent, heating operation by making a measurement of a second resistance value if more than a predetermined period of time has elapsed between the first heating operation and the second heating operation, and otherwise using the same baseline resistance value as for the first heating operation;

wherein the control circuitry is further configured to make a measurement of a second resistance value for the heating element for the second heating operation if less than the predetermined period of time has elapsed between the first heating operation and the second heating operation, and is further configured in that case to establish the baseline resistance value based on the second resistance value if the second resistance value is lower than the first resistance value, and otherwise use the same baseline resistance value as for the first heating operation.

14. A method of operating control circuitry in a vapor provision system, the vapor provision system comprising a heating element for generating a vapor from a vapor precursor material, wherein the control circuitry is configured to provide power for the heating element for performing a heating operation to generate the vapor and to compare a measurement of a resistance value for the heating element for a heating operation with a baseline resistance value for the heating element for use in detecting a fault condition during the heating operation; wherein the method comprises the control circuitry:

establishing the baseline resistance value for a first heating operation by making a measurement of a first resistance value for the heating element; and establishing the baseline resistance value for a second, subsequent, heating operation by making a measurement of a second resistance value for the heating element if more than a predetermined period of time has elapsed between the first heating operation and the second heating operation, and otherwise using the same baseline resistance value as for the first heating operation;

wherein the control circuitry is further configured to make a measurement of a second resistance value for the heating element for the second heating operation if less than the predetermined period of time has elapsed between the first heating operation and the second heating operation, and is further configured in that case to establish the baseline resistance value based on the second resistance value if the second resistance value is lower than the first resistance value, and otherwise use the same baseline resistance value as for the first heating operation.

* * * * *